United States Patent Office 2,955,124
Patented Oct. 4, 1960

2,955,124

MANUFACTURE OF ORGANOLEAD COMPOUNDS

Sidney M. Blitzer and Tillmon H. Pearson, Baton Rouge, La., assignors to Ethyl Corporation, New York, N.Y., a corporation of Delaware No Drawing. Filed Feb. 27, 1957, Ser. No. 642,636

6 Claims. (Cl. 260—437)

This invention relates to a process for the manufacture of organolead compounds. More specifically, it is particularly directed to a new and novel process for the manufacture of tetraalkyllead compounds, especially the important antiknock material, tetraethyllead.

The processes heretofore employed on a substantial scale are best illustrated by reference to the production of tetraethyllead. This material is in wide usage as an antiknock agent in the operation of internal combustion engines. The commercial process has generally been highly successful, but has certain inherent disadvantages not heretofore circumvented. The process proceeds by reacting a sodium-lead alloy, of composition controlled to correspond substantially to NaPb, with ethyl chloride according to the following equation:

$$4NaPb + 4C_2H_5Cl = (C_2H_5)_4Pb + 3Pb + 4NaCl$$

With the highest yields obtained thereby, only some 20 percent of the lead present in the NaPb alloy is converted to tetraethyllead. This conversion of lead to tetraethyllead has not been materially changed in many years, apparently because of an inherent limitation corresponding to the above equation. In this reaction, then, at least 75 percent of the lead originally employed is not alkylated. Large quantities of lead must then be recovered and reprocessed to NaPb alloy in order to make it economical. A further disadvantage of such a large quantity of unreacted lead is that valuable reaction space in the reactor is occupied by materials which are essentially inert for the manufacture of tetraethyllead under present conditions and mode of operation.

Other reaction processes for the production of hydrocarbon-lead compounds, especially tetraethyllead, have been devised to consume the lead produced in the above equation. While such processes are satisfactory from the standpoint of lead consumption, they suffer an additional drawback in common with the present commercial process in that they require organo halide as the ethylating agent. One such process is that described in U.S. Patent 2,535,190 wherein lead, as for example that produced in the commercial process, is treated with metallic magnesium and ethyl chloride in the presence of a catalyst, preferably an alkyl ether. Thus, in this process as well as the above mentioned alloy process, the tetraethyllead manufacturing operation is restricted by the necessary balance between the metallic sodium required and the organic chlorine in the ethyl chloride. A classical method for the manufacture of tetraethyllead which likewise requires strict balance between metallic magnesium and organic halide is the reaction of the so-called Grignard reagent, for instance ethyl magnesium chloride, with lead chloride.

More recently, a process has been developed which overcomes the disadvantages of the above and other prior art processes, produces a higher yield of the organolead product, and greater consumption of the lead metal. A typical example of this new development is the reaction of a lead organo acid salt with an active organometallic compound, for example, the reaction of lead acetate with triethyl aluminum. This process is generally satisfactory and a definite improvement over the prior art processes. However, a need in this process and the aforementioned prior art processes has been to further increase the yield of organolead product, in particular the commercial product tetraethyllead, to an even higher level in order to provide a more economical process. As a result of our work in this field such a process has been found.

It is an object of this invention to provide a novel process for the manufacture of organolead compounds which overcomes the prior art difficulties and provides such compounds in higher yields. Another object is to provide a more economical process for the manufacture of the organolead compounds. A still further object is to provide a new and improved process for the production of tetraethyllead in higher yields than obtained heretofore.

It has now been found that the organolead compounds can be produced in higher yields than heretofore obtainable by reacting a lead organo acid salt with an active organometallic compound in the presence of an ether. The employment of the ethers as a diluent in such a process results in a substantial increase in yield of the organolead product over that obtained when conducting this particular reaction in the presence of other diluents as for example the hydrocarbons. An additional benefit is that shorter reaction periods are required for completion of the reaction than required by the prior art processes. In general these benefits are obtained when conducting the reaction of the lead organic acid salt with active organometallic compounds in the presence of any of the ethers. However, the polyethers, especially of ethylene glycol and polyethylene glycol, have been found most suitable and in this connection the dimethyl ether of diethylene glycol and dimethoxyethane are particularly satisfactory. In one particularly preferred embodiment, the commercial product tetraethyllead is obtained by reacting lead acetate with triethyl aluminum in the presence of such ethylene glycol ethers.

As stated previously, in general any ether can be employed in the process of this invention since it has been found that all ethers produce a beneficial effect on the reaction. Some criteria of choice of the ether to be employed are that they be essentially inert to the reactants, liquid under the reaction conditions and preferably at room temperature, or soluble in the reaction mixture. Generally speaking, the ethers can be non-aromatic, aromatic, and polyethers. The non-aromatic ethers include the monoaliphatic and mixed ethers. Typical examples of the monoaliphatic ethers which we employ are di-n-butyl ether; di-sec-butyl ether; diisobutyl ether; di-n-amyl ether; di-n-heptyl ether; and the like saturated and unsaturated ethers. Examples of the mixed ethers which we employ are n-amylmethyl ether; tert-amylethyl ether; n-butylisopropyl ether; ethylisoamyl ether; n-butyl-n-propyl ether; and the like. The aromatic ethers include, for example, the mono aromatic ethers, alkyl aryl ethers, and the alkaryl alkyl ethers. Typical examples of the mono aromatic ethers include dibenzyl ether; diphenyl ether; and the like. When the aromatic ether is an alkyl aryl ether, we employ, for example, methylphenyl ether; methyl-o,m, or p-tolyl ether; methyl-α-naphthyl ether; ethylphenyl ether; ethyl-o,m, or p-tolyl ether; ethyl-α-naphthyl ether; phenyl-n-propyl ether; isopropylphenyl ether; n-butylphenyl ether; n-butyl-o-tolyl ether; isoamyl-n-naphthyl ether; and the like. The alkaryl alkyl ethers which we employ can be, for example, benzylmethyl ether; benzylethyl ether; benzyl-n-butyl ether; and the like. Examples of the polyethers which are employed are those having the configuration R—O—(CH$_2$)$_n$—O—R wherein R is an organic radical, preferably hydrocarbon or ether radicals, and $n$ is a small whole number as between about 1 to 10, preferably 1 to 3 inclusive. For example, such polyethers include ethylene glycol ethyl methyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxy-ethane, diethyl ether of diethylene glycol; and the like. Other polyethers which can be employed include, for example, pyrocatechol dimethyl ether; resorcinol dimethyl ether; 1,2,4-trimethoxybenzene, and the like. Typical examples of ethers which are solid but can be employed by virtue of their solubility in particular reaction mixtures include monoaromatic ethers such as didodecyl ether, hexadecyl ether, octadecyleicosyl ether, ditetracosyl ether, o-diethoxy benzene, trimethylene glycol diphenyl ether, 4-methoxy biphenyl and the like.

The foregoing are merely typical examples of the numerous ethers which can be employed in the process of this invention. Because of greater availability and easier handling, the liquid ethers are preferably employed. In this connection, the polyethers are especially preferred since higher yields are obtained when such are employed. Of such polyethers, the dimethyl ether of diethylene glycol and dimethoxyethane are particularly preferred. It is to be understood that the ethers employed need not be pure but can be mixtures of the various ethers discussed previously, for example a mixture of the diethyl ether and the dimethyl ether of diethylene glycol. Likewise, it has been found that economies can be effected while still obtaining the benefits of the ethers by their employment in admixture with other solvents or suspending media heretofore employed in the reaction of lead organo acid salts with active organometallics, for example, the hydrocarbons which are particularly preferred. Typical examples of such hydrocarbons are the liquid hydrocarbons as the nonanes, octadecanes, hexanes, toluene, benzene, xylene, and mixed hydrocarbons such as gasoline, diesel oil and the like petroleum fractions.

The proportion of the ether employed in the reaction media is not critical and can be varied over a wide range. Some benefit is observed when minor amounts of ether are employed. However, it is convenient to base the amount of ether employed on the active organometallic compound. For example, between about 0.5 part to 10 and more parts by weight of the ether can be employed per part by weight of the active organometallic compound. In a preferred embodiment between about 1 and 10 parts by weight of the ether are employed per part by weight of the active organometallic compound. It has been found that best results are obtained when at least an equal part of the solvent is employed per part of the active organometallic compound. More than about 10 parts of the ether per part of the organometallic compound can be employed; however, such amounts are not required and the process becomes less economical.

When the ether is employed in admixture with another solvent, for example the hydrocarbons, in general, the more ether contained in the mixture the higher the yield of organolead product. In this instance at least about 0.1 part of the ether per part of the organometallic compound is employed with the second diluent being present in amount over a wide range as between about 1 to 100 parts by weight thereof per part by weight of the ether employed. It is preferred however to employ at least 0.5 part by weight of the ether per part of the organometallic compound when employing such mixtures of the ether and hydrocarbon diluents.

Another particular benefit of the process of this invention, in addition to the higher yields obtained, is that shorter reaction periods can be employed. The reaction has been found to be essentially instantaneous even without the application of heat.

The process of this invention will be more completely understood from the following illustrative examples wherein all parts are by weight.

Example I

The equipment employed consisted of a reaction vessel equipped with external cooling and heating means as well as means for introducing the reactants to the reaction zone and internal agitation. To this vessel was added 19.73 parts dry lead acetate. The vessel was purged with dry nitrogen gas and 38 parts of the dimethyl ether of diethylene glycol was added thereto. From a dropping funnel, with agitation, there was added 4.2 parts of triethyl aluminum in 9 parts of the dimethyl ether of diethylene glycol. The reaction mixture was stirred ½ hour without heating at which time no further reaction appeared evident. The mixture was then heated to 100° C. for a period of 15 minutes. At this time the reaction vessel was cooled to room temperature, hydrolyzed and then filtered to remove the solid constituents. The filtrate was transferred to a fractionating still for removal of the ether solvent and recovery of tetraethyllead from the mixture. An essentially 100 percent yield of pure tetraethyllead was obtained.

Example II

Again employing the procedure of Example I essentially as described with exception that a total of 43 parts of dimethoxyethane was employed during the reaction and after starting without heating for 30 minutes the reaction mixture was heated to the reflux temperature, about 85° C., for 15 minutes the yield of tetraethyllead recovered was 96.5 percent.

When this run was repeated without the heating to reflux for 15 minutes, the yield obtained was 95 percent.

Example III

A 92 percent yield of tetraethyllead was obtained when Example I was duplicated essentially as described employing the same reactant quantities but employing diethyl ether as the solvent. In this instance, 25 parts of the ether were contained in the reactor and an additional 28 parts were added upon the addition of the triethyl aluminum. The triethyl aluminum was added over a period of 10 minutes and then the reaction mixture was stirred 20 minutes without heating.

Example IV

When 19.73 parts of lead acetate were reacted with 4.2 parts of triethyl aluminum in the presence of 45 parts of tetrahydrofuran, which had been purified by distilling from the sodium ketyl of benzophenone at the reflux temperature for 1½ hours, a yield of 95.8 percent of tetraethyllead was obtained.

Example V

When reacting 24.6 parts of lead formate with 4.2 parts of triethyl aluminum in 47 parts of the dimethyl ether of diethylene glycol with the temperature between 100 to 110° C. for 1½ hours, a high yield of tetraethyllead was obtained.

When this run was repeated with exception that 1,3-dimethoxybutane was employed as the solvent and the temperature was maintained between 95 and 100° C., tetraethyllead was obtained in high yield.

Example VI

When 4.2 parts of aluminum triethyl were reacted with 50 parts of lead naphthenate in 43 parts of dimethoxyethane without heating or cooling for 15 minutes, the yield of tetraethyllead was 91.6 percent.

Example VII

When lead oxalate is reacted with triethyl aluminum in isopropyl ether essentially as described in Example I but under sufficient pressure to maintain the reaction mixture liquid, a high yield of tetraethyllead is obtained.

*Example VIII*

When lead benzoate, lead butyrate, or lead oleate are reacted with triethyl aluminum in furan, vinyl butyl ether, anisole, diethyl acetal or dimethyl ether of tetraethylene glycol, high yields of tetraethyllead are obtained.

The foregoing examples illustrate typical ethers which are employed in the process of this invention. In place of the particular ethers employed therein similar results are obtained when the ethers mentioned hereinbefore are substituted, for example di-n-butyl ether, n-amyl methyl ether, diphenyl ether, methylphenyl ether, diethyl ether of ethylene glycol, dioxane, the diethyl ether of diethylene glycol and the like.

The employment of the ethers as solvents in the present process consistently results in obtaining higher yields of the organolead compound. As a typical illustration of these benefits of the present invention a controlled comparison was made in which lead acetate was reacted with triethyl aluminum under identical conditions employing, in one instance, toluene and in the other instance the dimethyl ether of diethylene glycol as the solvent. It was found that the ether solvent, for the same reaction time and temperature, resulted in a 10 percent increase in yield. Similar and in most instances greater enhancement in yield of the organolead product is obtained when other ethers are compared with other solvents employed heretofore in the reaction of lead organo acid with stable organometallic compounds.

The following examples will demonstrate that embodiment of this invention wherein mixtures of the ether solvent with other solvents are employed.

*Example IX*

The procedure of Example I was employed essentially as described with exception that the solvent comprised 31 parts of heptane in admixture with 4.9 parts of the dimethyl ether of diethylene glycol. The reaction was conducted at the reflux temperature of the mixture for 1½ hours. The yield of tetraethyllead was 91.1 percent.

*Example X*

The procedure of Example IX was repeated with exception that 3.3 parts of 1,2-dimethoxyethane in admixture with 40 parts of toluene were employed. The yield of tetraethyllead was 90.4 percent.

*Example XI*

When Example IX was repeated essentially as described with exception that the solvent comprised 2.8 parts of diethyl ether and 43 parts of toluene with the reaction conducted at the reflux temperature for 1½ hours, the yield of tetraethyllead was 91.4 percent.

When this run was duplicated with exception that 8.2 parts of the diethyl ether in the same amount of toluene was employed, the yield of tetraethyllead was 93.7 percent.

When other mixtures of ethers with the hydrocarbon and other solvents as, for example, organic halides and amines, are employed as described previously, similar results are obtained.

The present invention is concerned with an improvement in the reaction of the lead organo acid salts with the active organometallics. Briefly, this process comprises reacting these compounds at varied temperatures as between about −20° to 200° C. and preferably between 25 and 150° C. However, if desired, thermal stabilizers well known to the art, for example naphthalene and styrene, can be employed to permit the use of higher reaction temperatures without concomitant degradation of the organolead product. Generally the autogenous pressure is employed although the pressure is not critical and the reaction can be conducted at atmospheric or sub-atmospheric pressure.

The lead organo-acid salt employed in conducting this process comprises lead compounds in which the lead is attached to at least 1 carbon-containing radical through an intermediate atom of oxygen or sulphur, that is a chalkogen. Such definition includes also recognized organic acids not having a carboxylic group. Thus the lead salts employed are lead carboxylate, lead thiocarboxylate, lead phenate and lead thiophenates. The organic portion can contain other elements besides carbon and hydrogen, in particular oxygen or other substituents such as halogen which are essentially inert in the reaction. Typical of the lead salts which are employed are lead acetate, lead tetraacetate, lead laurate, lead propionate, lead phenate, lead thiophenate, lead salicylate, lead tallate, lead naphthenate, and the like. Thus in any of the Examples I through XI, these compounds can be substituted for the lead salt employed and similar results are obtained. In preferred embodiments the lead organo acid salt has between 1 and 21 carbon atoms in each acidic radical.

The active organometallic compounds can be any organometallic compound of a metal having a electrode potential of more than 0.3 volt and capable of forming stable organometallic compounds. Included among such metals are the group IA metals such as lithium and sodium, group II metals such as beryllium, magnesium, zinc and calcium, and the group III-A metals such as boron, aluminum and the like. The fully organic substituted compounds of the polyvalent metals are preferred, particularly aluminum, but organic compounds of monovalent active metals and partially organo-substituted derivatives of the polyvalent metals are suitable. Further, complex organometallic compounds can be employed, that is, compounds having more than one metal, particularly an alkali or alkaline earth metal and a polyvalent metal therein. Typical examples of the active organometallic compounds which can be employed include ethyl sodium, trimethylaluminum, methyldiethylaluminum, ethyl lithium, diethylmagnesium, ethyl magnesium chloride, diethylzinc, triethylborine, methylethyloctylaluminum, diethylaluminum hydride, sodium aluminum tetraethyl, ethylaluminum sesquichloride, dimethyllindium hydride, tricyclohexylaluminum, phenyl sodium, diphenyl zinc, naphthylsodium, tripropylaluminum, cyclohexyldiethylaluminum, tritolylaluminum, and the like organometallic compounds including such compounds which are substituted by organic substituents which are essentially inert in the reaction. In general, however, the alkyl metal compounds, particularly those in which the alkyl groups contain between 1 and 8 carbon atoms, are especially preferred because of their greater availability and ease of formation.

In this process it is also to be recognized that the lead organo acid salts are also effective in conjunction with other inorganic salts, for example, the lead sulphides and oxides. The double salts are particularly suitable, for example, the double salt of lead acetate and lead oxide.

The following examples will demonstrate other particular embodiments of this invention employing the aforementioned representative organometallic compounds and lead salts of organo acids.

*Example XII*

To a reaction vessel similar to that employed in Example I was added 52 parts of dimethoxyethane and 8.3 parts of lead acetate. This mixture was heated to 60° C. and then a solution of about 2 parts of diethylmagnesium in 35 parts diethyl ether was slowly added. The diethyl ether was condensed and removed as it vaporized from the reaction mixture. After a total reaction time of two hours at a temperature up to about 85–90° C., the mixture was cooled to room temperature and processed as in the preceding examples. The yield of tetraethyllead was 76 percent.

Example XIII

The procedure of Example I is repeated with exception that 15.5 parts of lead tetraacetate are reacted with 4.0 parts of triethylaluminum in 45 parts of the diethylether of diethylene glycol. A high yield of tetraethyllead is obtained.

Example XIV

Tetrabutyllead is obtained in high yield when stoichiometric quantities of sodium aluminum tributyl hydride are reacted with lead palmitate at 60° C. for 3 hours in the presence of dioxane.

Example XV

Employing the procedure of Example I, an essentially quantitative yield of tetraethyllead is obtained when lead tetraacetate is reacted with sodium aluminum tetraethyl in tetrahydrofuran at the reflux temperature for 1 hour.

Example XVI

When triphenyl aluminum is reacted with lead stearate in the dimethyl ether of diethylene glycol, tetraphenyl lead is obtained in high yield.

Example XVII

An enhanced yield of tetraethyllead is obtained when diethyl zinc is reacted with lead phenolate in the presence of diethylene glycol diethyl ether at the reflux temperature.

Example XVIII

Employing the procedure of Example I, when 247.5 parts of ethylaluminum sesquichloride are introduced into the reaction vessel with 150 parts of the dimethyl ether of diethylene glycol and reacted with 443 parts of lead tetraacetate at about 90° C. for 2 hours a high yield of tetraethyllead is obtained.

In any of the Examples I through XVIII, effective results are obtained when trioctylaluminum, triethylindium, lithium aluminumtetraethyl, methylaluminum dihydride, dimethylaluminum chloride, octylaluminum sesquichloride, diisopropyl zinc, ethylzinchydride, di-n-hexylcalcium and the like are substituted for the organometallic compounds employed therein. Likewise lead naphthenate, lead citrate, lead salicylate, lead phenol sulfonate, and the like lead organo acid salts can be substituted for the lead compounds employed therein.

From the foregoing description and examples it will be evident that the process is capable of a large number of embodiments without departing from the spirit and scope thereof. Thus the technique of carrying out the reaction including the temperature and pressure, mode of addition, batch and continuous techniques, and the physical state of the reactants can be varied. Being illustrative, it is not intended that the foregoing description shall in any way limit the scope of the present invention.

Having thus described the process of the present invention, what is claimed is:

1. In a process for the manufacture of a hydrocarbon lead compound which comprises reacting a lead organo acid salt wherein lead is attached to at least one carbon containing radical through an intermediate atom selected from the group consisting of oxygen and sulfur and an active hydrocarbon metal compound of a metal selected from the group consisting of group I-A, II, and III-A metals having an electrode potential of more than 0.3 volt and wherein the hydrocarbon groups of said active hydrocarbon metal compound are selected from the group consisting of alkyl, cycloalkyl, and aryl groups having up to and including 10 carbon atoms, the improvement which comprises conducting said reaction in the presence of an ether which is essentially inert to the reactants, liquid under the reaction conditions, and selected from the group consisting of alkyl and aryl ethers.

2. The process of claim 1 wherein said ether is a polyether.

3. The process of claim 1 wherein said ether is employed in admixture with a hydrocarbon solvent.

4. The process for manufacturing tetraethyllead which comprises reacting lead acetate with triethylaluminum in the presence of the dimethyl ether of diethylene glycol at a temperature between about 25 to 150° C. and recovering tetraethyllead upon completion of the reaction.

5. The process of claim 1 wherein said lead organo acid salt is a lead salt of an alkanoic acid, said hydrocarbon metal compound is a group III-A metal alkyl, said ether is an alkyl ether, and said reaction is conducted at a temperature between about 25 to 150° C.

6. The process of claim 5 wherein said lead organo acid salt is lead acetate and said group III-A metal alkyl is triethylaluminum.

References Cited in the file of this patent

UNITED STATES PATENTS

| | | |
|---|---|---|
| 1,705,723 | Daudt | Mar. 19, 1929 |
| 1,938,180 | Groll | Dec. 5, 1933 |
| 1,949,948 | Alleman | Mar. 6, 1934 |
| 2,859,231 | Blitzer et al. | Nov. 4, 1958 |